United States Patent

Tate et al.

[11] Patent Number: 5,309,489
[45] Date of Patent: May 3, 1994

[54] NUCLEAR REACTOR WITH COOLING APPARATUS AND METHOD

[75] Inventors: Hitoshi Tate; Kenji Tominaga; Tadashi Fujii, all of Hitachi, Japan

[73] Assignee: Hitachi, Ltd., Tokyo, Japan

[21] Appl. No.: 854,465

[22] Filed: Mar. 19, 1992

[30] Foreign Application Priority Data

Mar. 20, 1991 [JP] Japan ................................. 3-057093

[51] Int. Cl.$^5$ ........................................... G21C 15/18
[52] U.S. Cl. ..................................... 376/299; 376/283
[58] Field of Search ............... 376/283, 293, 298, 299, 376/361, 383, 384

[56] References Cited

U.S. PATENT DOCUMENTS

| | | | |
|---|---|---|---|
| 3,930,939 | 1/1976 | Bittermann et al. | 376/283 |
| 5,049,353 | 9/1991 | Conway et al. | 376/299 |
| 5,087,408 | 2/1992 | Tominaga et al. | 376/299 |

FOREIGN PATENT DOCUMENTS

| | | | |
|---|---|---|---|
| 53-8493 | 1/1978 | Japan | 376/283 |
| 59-83086 | 5/1984 | Japan | 376/283 |
| 63-191096 | 8/1988 | Japan . | |
| 64-16991 | 1/1989 | Japan | 376/283 |

Primary Examiner—Daniel D. Wasil
Attorney, Agent, or Firm—Evenson, McKeown, Edwards & Lenahan

[57] ABSTRACT

Nuclear reactor and nuclear reactor cooling facilities, and also a nuclear power generation plant and a method of its operation are disclosed. The reliability of cooling function at the time of anticipated accidents is substantially improved through enhancing a cooling efficiency of the gas in the reactor container without resorting to any particular active means. Guide structure is provided for circulating the gas present in the reactor container so as to accelerate heat removal therefrom to the outside through the surface of the reactor container. The arrangement includes an internal structure for retaining a coolant in the reactor container; and upper space portion disposed over the internal structure; a first gas flow passage for directing downward the gas present in the above upper space portion; and a second gas flow passage connecting the first gas flow passage with the upper space portion. Further, circulation structure is provided for circulating the gas in the above reactor container through utilization of the decay heat of the core. By means of the natural circulation through the wet well vapor phase including the upper space portion, with nitrogen gas ($N_2$) rendered ubiquitous in the wet well vapor phase portion thereby the gas temperature being evenly distributed, it is possible to substantially improve the core decay heat removal efficiency in the reactor container by air cooling.

20 Claims, 8 Drawing Sheets

NUCLEAR REACTOR WITH COOLING APPARATUS AND METHOD

BACKGROUND AND SUMMARY OF THE INVENTION

The present invention relates to cooling technology for a nuclear reactor. More specifically, especially preferred embodiments of the invention relate to cooling apparatus and techniques suitable for use in removing the decay heat from a reactor container, which decay heat is produced in a reactor core at the time of a loss of coolant (LOCA) accident.

Japanese patent publication No. 63-191096 (1988) discloses an arrangement which includes a cooling water pool around the outer periphery of a nuclear reactor container with transfer of heat from a pressure suppression chamber in the reactor container to the outer water pool through a heat conducting surface of the container according to a temperature difference therebetween, by means of the natural convection both in the pressure suppression chamber and the outer pool. Eventually the heat is removed by evaporation of the pool water. Further, an air-conditioning system is normally in operation to cool an internal heat and remove it from the reactor container.

An upper space of the reactor container is purged with a nitrogen gas in normal operations. According to the prior art set forth in the above publication, as only the gas present in the vicinity of the inner surface of the reactor container is capable of being cooled, there is a problem that the gas in the center portion is not likely to be cooled, failing to attain an efficient heat removal. Further, there is a problem that conventional air-conditioning systems normally provided therein are not capable of coping with an emergency or accident because of their insufficient handling capacities.

An object of the present invention is to provide a nuclear reactor and nuclear reactor cooling facilities, a nuclear power generation plant and a method of its operation, wherein reliability in cooling functions at the time of emergencies is substantially improved by enhancing the cooling efficiency for the gas in the reactor container.

A second object of the present invention is to provide a nuclear reactor and nuclear reactor cooling facilities, a nuclear power generation plant and a method of its operation wherein reliability in cooling functions at the time of emergencies is substantially improved, without resorting to any active external power source.

The above-noted first object is achieved according to preferred embodiments of the invention by providing means for circulating the gas in the reactor container so as to accelerate heat removal out of the reactor container therethrough. More specifically, the accelerated heat removal is accomplished by providing an arrangement including internal structure for retaining the coolant in the reactor container, an upper space disposed over the internal structure, a first gas passage for directing the gas in the upper space downward, and a second gas passage connecting between the first gas passage and the upper space.

The above-noted second object of the present invention is accomplished by providing means for circulating the gas in the reactor container by utilizing a decay heat therein.

By circulating the gas in the reactor container, a gas present in the center potion thereof is also capable of being directed toward the vicinity of the inner surface of the reactor container. As a result, heat existing in the center portion is also capable of being removed from the reactor container therethrough.

Further, in a nuclear reactor the reactor container of which is partitioned by an inner structure and an upper space thereabove, retention of a gas in the upper space is prevented according to preferred embodiments of the invention by once directing the upper space gas downward, and then recirculating the same gas upward to the upper space. With this arrangement, heat in the upper space is removed rather readily on the whole through the reactor container. A preferred route for the gas to be directed downward is along the inner surface of the reactor container. Far more enhanced heat removal effect will be achieved by cooling the outer surface of the reactor container with air or the like according to especially preferred embodiments.

In order to circulate the gas, some appropriate means for this purpose is provided by preferred embodiments of the invention. Hence, by providing means for permitting the gas which was directed downward cooled along the inner surface of the reactor core to be directed upward by utilizing a decay heat generated at the time of an accident, so-called natural circulation for recirculating the gas is accomplished without utilizing any particular external power source. For example, in a nuclear reactor having a pressure suppression chamber retaining cooling water to condense a discharge gas from the reactor container, a natural circulation is capable of being implemented by permitting the cooled gas which came down condensed along the inner surface of the container to be carried upward by the vapor generated in the pressure suppression chamber.

Other objects, advantages and novel features of the present invention will become apparent from the following detailed description of the invention when considered in conjunction with the accompanying drawings.

DETAILED DESCRIPTION OF THE DRAWINGS

Figure 1:
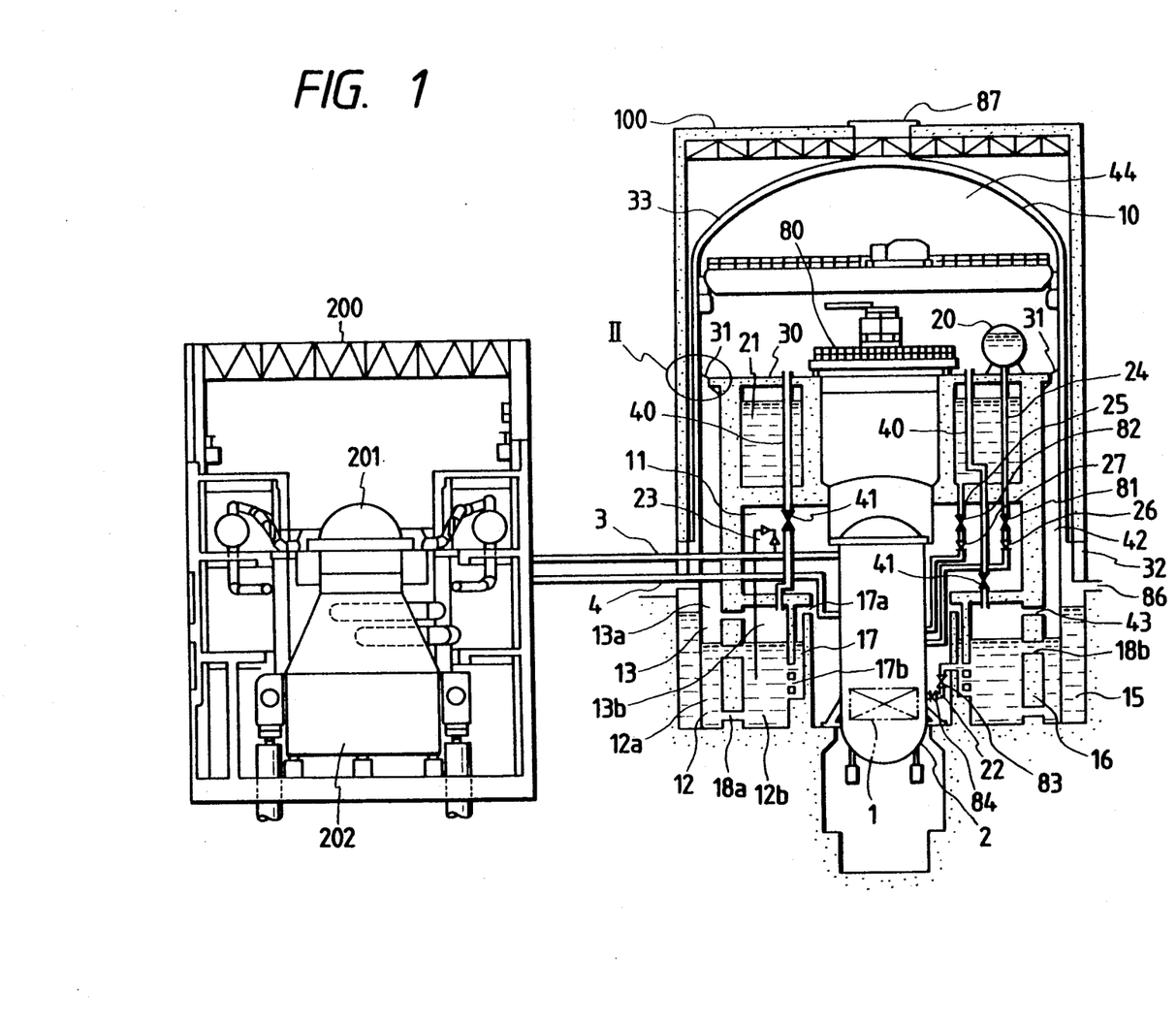
FIG. 1 is a schematic diagram of a boiling water reactor nuclear power generation plant constructed according to a preferred embodiment of the present invention.

FIG. 1 shows a schematic diagram of a boiling water reactor nuclear power generation plant with an electrical output of 1350 MW (mega watts) embodying the present invention. The boiling water reactor nuclear power generation plant is roughly divided into a nuclear reactor building 100 and a turbine building 200. During normal operation for power generation, nuclear reaction heat from a reactor core 1 which corresponds to a boiler is given to the cooling water in a pressure vessel 2 to produce a high temperature high pressure steam, which is carried to a turbine 201 through a main steam piping 3 for driving the same to generate electrical power. The steam, after having driven the turbine 201, is condensed in a condenser 202 and is returned to the pressure vessel 2 through a feed water piping 4. Both main steam piping 3 and feed water piping 4 are extended from the pressure vessel 2 out of the nuclear reactor container 10.

Referring to FIG. 1, in the nuclear reactor building 100, a concrete wall structure 16 in the reactor container 10 partitions itself into a cooling water pool 21, a dry well 11 and a pressure suppression chamber 12, respectively. On the internal structure composed of the concrete wall structure 16 in the container 10, there is provided an operating floor 30 which accommodates installation and operation of handling equipment 80 for handling nuclear fuel elements and the like provided in the pressure vessel 2. The upper portion above the operating floor 30 constitutes an upper space portion 44 purged with nitrogen gas during normal operations. This structure composed of concrete wall structure 16 is enclosed in a nuclear reactor container 10 made of steel.

Inside the dry well 11, the pressure vessel 2 is installed. Further, inside the pressure vessel 2, a reactor core 1 comprising nuclear fuel elements is stored. The pressure suppression chamber 12 and the dry wall 11 are communicated with each other through a vent tube 17 having inlet 17a and outlet 17b. A wet well 13 which constitutes an upper space in the pressure suppression chamber is divided by the concrete well structure 16 into an outer peripheral portion 13a which is in contact with the reactor container 10, and an inner peripheral portion 13b which is not in contact with the container 10. Because there are a plurality of communicative openings 18 in the concrete wall structure 16 in the submerged portion thereof in the pressure suppression chamber, the pool water is capable of circulating between the divided inner pool 12b and the outer pool 12a through the plurality of communication openings 18.

The wet well 13 is divided into a liquid phase portion submerged in the pool water and a vapor phase portion filled with purged water. Also in the upper portion of the vapor phase portion, i.e., in the pressure suppression chamber 12, there is provided a communication opening 43 which connects to a passage 42 formed between the concrete wall structure 16 and the reactor container 10. Care is taken in determining a volume of water to be retained in the emergency cooling water pool so as not to submerge the communication openings 43. The vapor phase portion of the wet well 13b in the pressure suppression chamber 12 communicates with the upper space portion 44 through piping 40, hence forming a gas flow passage. A valve 41 is provided in the piping 40. Under normal operation, the valve 41 is closed. When emergencies such as loss of coolant accidents to be described or the like occur, it is rendered open. The outlet of the piping 40 is disposed near the center of the reactor container in the form of a bent structure.

An automatic pressure reducing system is built up in the dry well 11. The automatic pressure reducing system comprises an automatic pressure reducing valve 23 provided in the way of the main steam piping 3, a piping connected to the vent of the automatic pressure reducing valve 23, with the same piping extending into the pool water in the pressure suppression chamber 12, and a control system for opening the automatic pressure reducing valve 23 when measuring means for measuring water levels in the pressure vessel 2 detects a critical level.

Within the reactor container 10, a plural component emergency core cooling systems (ECCS) are built in. Firstly, a pressurized accumulator type emergency core cooling system comprises: an accumulator tank 20 installed on the operation floor 30; a piping 24 connecting between the accumulator tank 20 and the pressure vessel 2; a check valve 26 provided in the piping 24 for preventing a flow in the direction toward the accumulator tank 20; and a valve 81 provided likewise. A gas pressure in the accumulator tank is, for example, 3 MPa (3,000 times atmospheric pressure). Nextly, a gravitational fall emergency core cooling system comprises: a cooling water pool 21; a piping 25 connecting between the cooling water pool 21 and the pressure vessel 2; a check valve 27 provided in the piping 25 for preventing a flow in the direction toward the cooling water pool 21; and a valve 82 provided therein likewise. Further, a core submersion system comprises: a core submersion piping 22 which connects between the pressure suppression chamber 12 and the pressure vessel 2; a check valve 84 provided in the piping 22 for preventing a flow toward the pressure suppression chamber 12; and a valve 83 provided likewise. The height of the outlet of this core submersion piping 22 in the pressure vessel 2 is preferably disposed somewhat higher than the upper end of the core 1.

Figure 2:
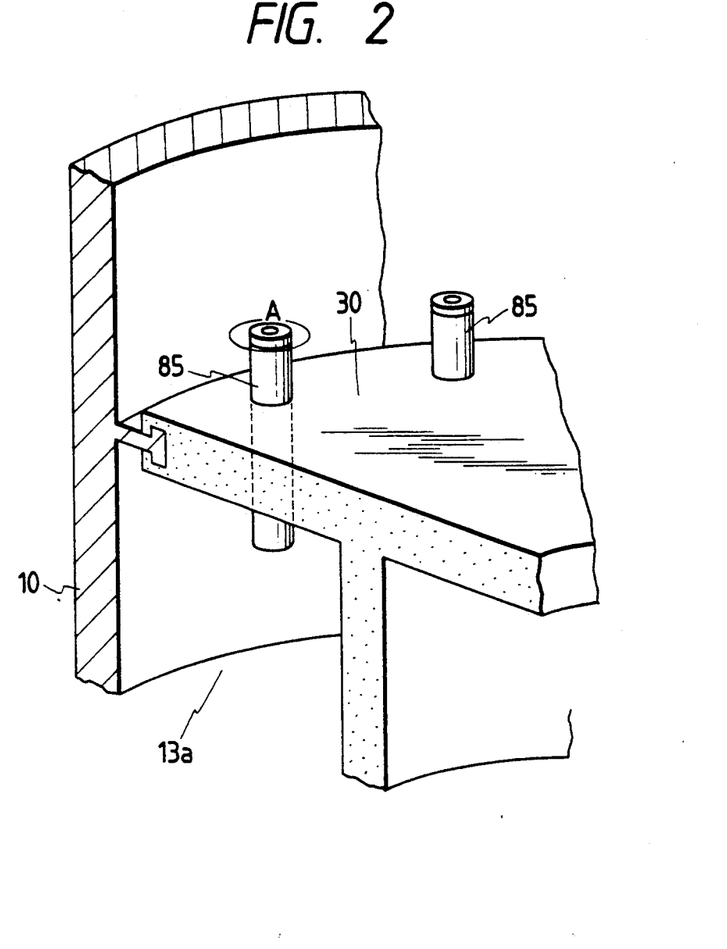
FIG. 2 is an enlarged schematic, part sectional view of portion II of FIG. 1.
Figure 3:
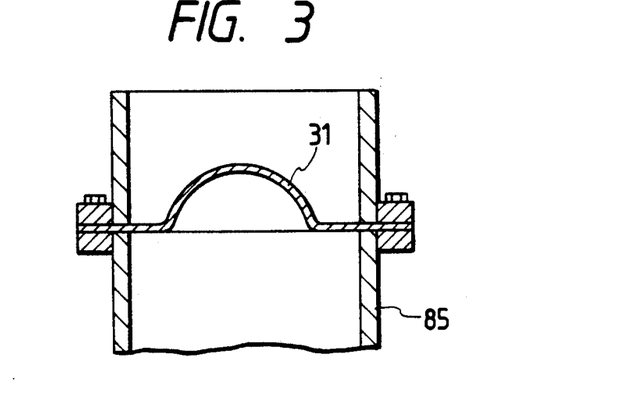
FIG. 3 is an enlarged schematic sectional view of a piping and pressure relief plate construction for the piping arrangement shown in FIG. 2.

The reactor container 10 and the upper end portion of the concrete wall structure 16 are hermetically joined as shown in FIG. 2. Further in the concrete wall structure 16, pipings 85 are provided as shown in FIGS. 2 and 3 penetrating therethrough from underneath to above the operating floor 30. A pressure relief plate 31 is attached to the upper portion of the piping 85 as shown in FIG. 3 in a manner so as to plug the piping 85. The pressure relief plate 31 has such a strength that is capable of being ruptured to provide an opening by an increased pressure introduced in the wet well 13 in the pressure suppression chamber at the time of an accident. Hence, the pressure relief plate 31 is employed as valve control means, for serving with its opening closed under normal operations, and providing a passage opened by the increased pressure at the time of the accident.

The bottom portion of the reactor container 10 is submerged in the outer periphery pool 15 which is in contact with the inner peripheral surface of the reactor container 10. This outer peripheral pool is provided with a vent 86 communicating to the outside. A duct 33 for air cooling is provided in the upper portion of the reactor container 10 over the outer peripheral pool 15. The air cooling duct 33 is provided with an air inlet port 32 disposed in the bottom and an air outlet port 87 disposed in the upper end. The outer portion of the air cooling duct 33 is enclosed in the nuclear reactor building wall 88 except for the air inlet port 32 and the air outlet port 87.

Next, the function of the equipment in such nuclear reactor facilities at an anticipated loss of coolant accident while the reactor is in operation will be described in the following.

In an anticipated loss of coolant accident, for example, due to a possible rupture of the main steam piping 3, a high temperature high pressure steam in the pressure vessel 2 will be discharged into the dry well 11 through the ruptured opening. Because of a decreasing quantity of cooling water in the pressure vessel 2 due to a spillage through the ruptured piping, the cooling capability to cool the reactor core 1 decreases. When the core 1 is shut down of its nuclear reaction after the anticipated accident, and the water level of the cooling water in the pressure vessel 2 still goes down, the automatic pressure reducing valve 23 provided in the main steam piping is activated, thereby permitting the steam in the pressure vessel 2 to be relieved into the pressure suppression chamber 12, resulting in an accelerated reduction in the pressure in the nuclear reactor.

When the pressure in the pressure vessel 2 becomes smaller than that in the accumulator tank 20 through operation of the automatic pressure reducing valve 23, with the check valve 26 being opened, the cooling water stored in the accumulator tank 20 is injected under pressure into the pressure vessel 2 through piping 24, hence cooling the core 1. Then, as the internal pressure in the pressure vessel 2 drops lower than a pressure existing corresponding to a head differential between water levels in the cooling water pool 21 and the pressure vessel 2, with the check valve 27 being opened before the entire volume of cooling water in the accumulator tank 20 pool 21 is permitted to be injected into the pressure vessel 2 by gravitation fall through piping 25. A large quantity of cooling water retained in the cooling water pool 21 submerges the reactor core 1, further overflows through the ruptured portion in the piping to submerge the lower space portion of the dry well 11 under the pressure vessel 2. When the water level of the cooling water filling the space in the lower dry well 11 rises up to the upper end of the vent tube 17, the cooling water is admitted into the pressure suppression chamber 12 increasing the depth of water therein. Thereby, a head differential is produced between the water levels in the pressure suppression chamber 12 and the reactor core 1 because of the increased depth of water in the pressure suppression chamber supplied with the retention water from the cooling water pool 21. By making use of this head differential, the water in the pressure suppression chamber 12 is injected into the pressure vessel 2 through the submerging piping. The water injected into the pressure vessel 2 is vaporized by the decay heat therein, and the vapor is discharged through the ruptured portion in the piping and the automatic pressure reducing valve 23 into the pressure suppression pool 12 to be condensed into water, then the condensed water is once again fed into the pressure vessel 2 through the submerging piping 22, hence constituting a cooling water circulation system.

Figure 4A:
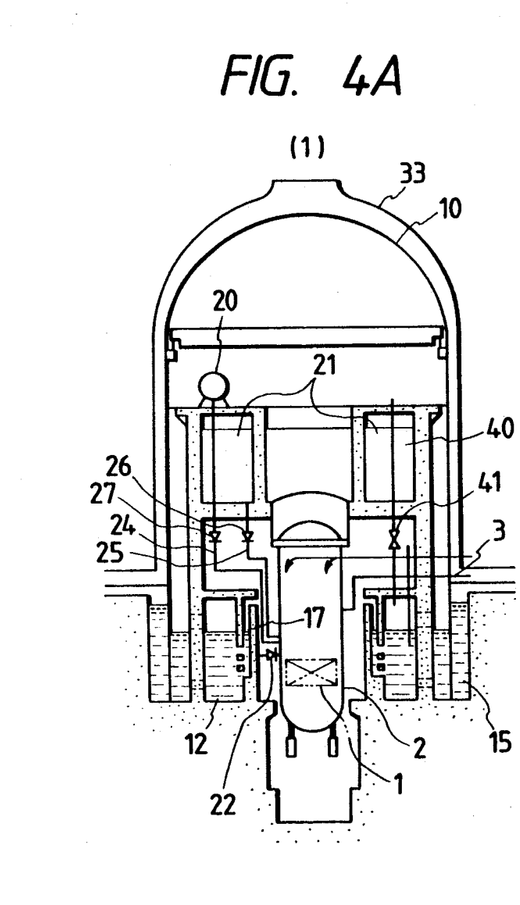
FIGS. 4A, 4B, and 4C illustrate respective changes in water levels of retention water in a nuclear reactor of FIGS. 1-3, after an accident.
Figure 4B:
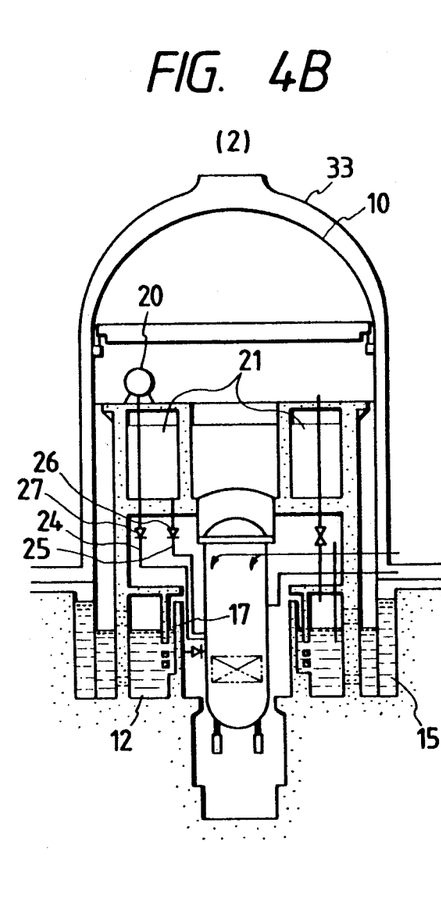
Figure 4C:
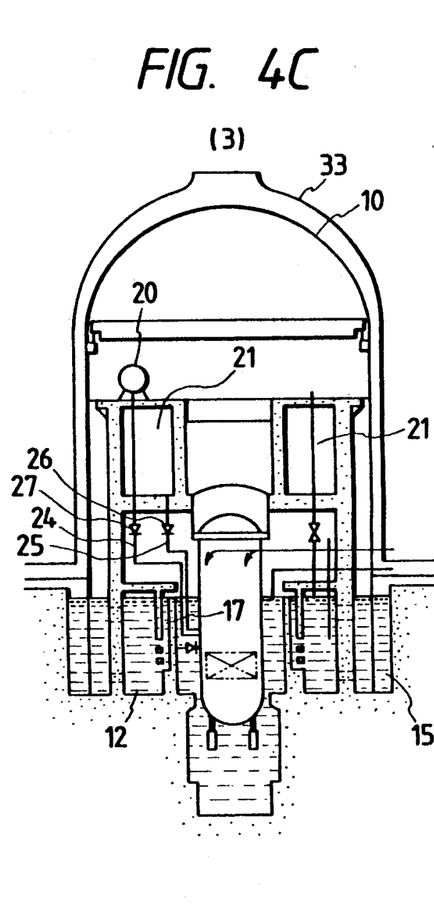

FIGS. 4A, 4B, and 4C illustrate the changes in the water levels of retention water in each of three types of ECCS such as to be described later, after the occurrence of an anticipated accident. FIG. 4A indicates the water levels of retention water under normal operation. Under this condition, both an accumulator tank type ECCS and a gravitational fall type ECCS hold a full-capacity cooling water. FIG. 4B shows the water levels of respective retention water after the occurrence of an accident, when the accumulator type ECCS is activated to empty its retention water in the accumulator tank 20, and the gravitational fall type ECCS starts its operation. Lastly, FIG. 4C illustrates a state in which the cooling water pool 21 of the gravitational fall ECCS emptied its retention water, and the cooling water of the ECCS submerged the lower space of a dry well 11 up to the upper end of vent tube 17, further increasing the depth of water in the pressure suppression chamber 12. Because of an increased depth of water in the pressure suppression chamber 12 supplied with the retention water from the gravitational fall type ECCS, a head differential is produced between the water levels in the reactor core 1 and the pressure suppression chamber 12 which is installed lateral to the pressure vessel 2. Thereby, it becomes possible, by utilizing this head differential, to inject the water in the pressure suppression chamber 12 into the pressure vessel 2 through a reactor core submerging piping 22 which connects the pressure suppression chamber 12 and the pressure vessel 2. The cooling water injected into the pressure vessel 2 is vaporized by the decay heat in the reactor core 1, and the steam is discharged through the ruptured portion in piping or the automatic pressure reducing valve into the pressure suppression chamber 12 to be condensed into water, then the water is once again fed into the pressure vessel 2 through a reactor core submerging piping 22 to cool the reactor core 1, thus constituting a cooling water circulation system. By means of this reactor core submerging piping system, it becomes possible to sustain a long-term cooling of the reactor core 1 without feeding water from the outside. Further, a quantity of water to be retained in the gravitational fall type ECCS is determined so as not to allow any interruption of cooling of the reactor core 1 at the time of switching to and starting the reactor core submerging system after a full-capacity of retention water of the gravitational fall ECCS is emptied, in consideration of a quantity of water needed to ensure a head difference between the water levels in the pressure suppression chamber 12 and the reactor core 1 thereby to enable injection of the cooling water into the core 1 through the reactor core submerging piping 22, a sufficient quantity of water needed for the cooling of the reactor core 1, and a quantity of water needed for submerging the lower space portion of a dry well 11 under the pressure vessel 2 and up to the upper end of a vent tube 17. Furthermore, it is only required of the gravitational fall ECCS to function until the space in the lower dry well portion 11 is submerged up to the upper end of the vent tube 17, the depth of water in the pressure suppression chamber 12 is increased, and the reactor core submersion system for a long term cooling is activated.

Lastly, a method and its operation characteristic of the present invention for efficiently cooling a gas present in the upper space 44 will be described below referring to the drawings. When an accident occurs, the pressure relief plate 31 is activated as described previously. Thereby, by rendering the valve 41 on the piping 40 open, the first gas passage comprised of the passage 42 defined by the pressure relief plate 31, the reactor container 10 and the concrete wall structure 16; and the second gas passage comprised of the communicative opening 43, the upper wet well vapor portion in the pressure suppression chamber 12 and the piping 40 connecting to the upper space portion 44, are connected providing a through passage for the gas flow. By means of these two gas passages, a gas circulation passage is formed for the gas to flow out from the upper space portion 44 and then return to the same. In addition, since the outlet of piping 40 is disposed near the center portion of the reactor container, this circulation passage involves a large circulation region extending from the center portion in the reactor container 10 to the inner wall thereof, hence it is capable of involving the gas present in the upper space portion into an entire gas flow therein. The first gas passage and the second gas passage are divided by the communicative opening 43, but they may be divided by another portion according to other contemplated embodiments. In a condition such as this, when the decay heat in the reactor core is transferred to the liquid phase portion in the wet well through vapor condensation via vent tube 27, the temperature of cooling water in the pressure suppression chamber 12, i.e., of the liquid phase portion in the wet well rises. The heat in the wet well liquid phase portion is either transferred to the outer water pool 15 or utilized for vaporizing the water in the wet well liquid phase portion. At this time, the vaporized steam moves upward from the wet well vapor phase portion to the upper space portion 44 through piping 40, mixes with $N_2$ gas present therein to produce a mixture gas of steam and $N_2$. This mixture gas is cooled in contact with the inner wall of the reactor container 10 which is cooled by air flowing in an air cooling duct 33. The cooled mixture gas flows downward through the open pressure relief plate 31 in the passage 42, then through the communicative opening 43 reaching again the wet well vapor phase portion. As described hereinabove, the upper space portion gas is circulated, driven by the decay heat, with no resident gas staying in the upper space portion 44, thereby, the gas is capable of being cooled efficiently in the upper space region. Further, the communicative opening 43 is assured not to be submerged since optimum volumes of water to be retained in the cooling water pool 21 and accumulator tank 20 for emergency cooling are determined at most appropriate levels.

According to the present invention as set forth hereinabove, since the gas in the reactor container is capable of being efficiently cooled, the decay heat is capable of being removed efficiently. as a result, it is possible to improve the reliability of the cooling function at the time of an accident. Further, it is also possible to improve the reliability of the cooling function at the time of an accident, without using any active power, but only using the decay heat as a power source.

Figure 5:
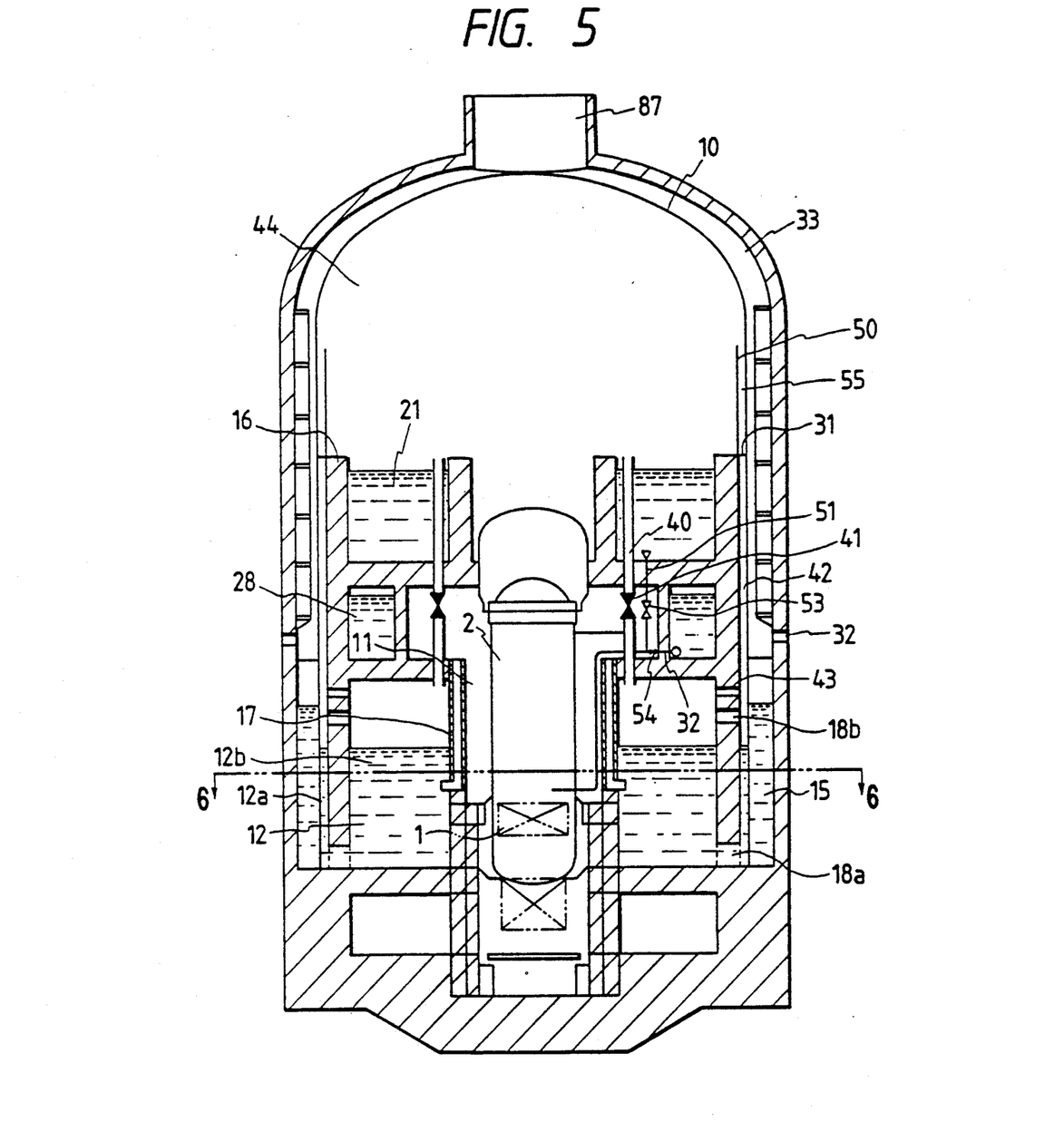
FIG. 5 is a view similar to FIG. 4A which shows a second embodiment of the present invention in a condition before the occurrence of an accident.
Figure 6:
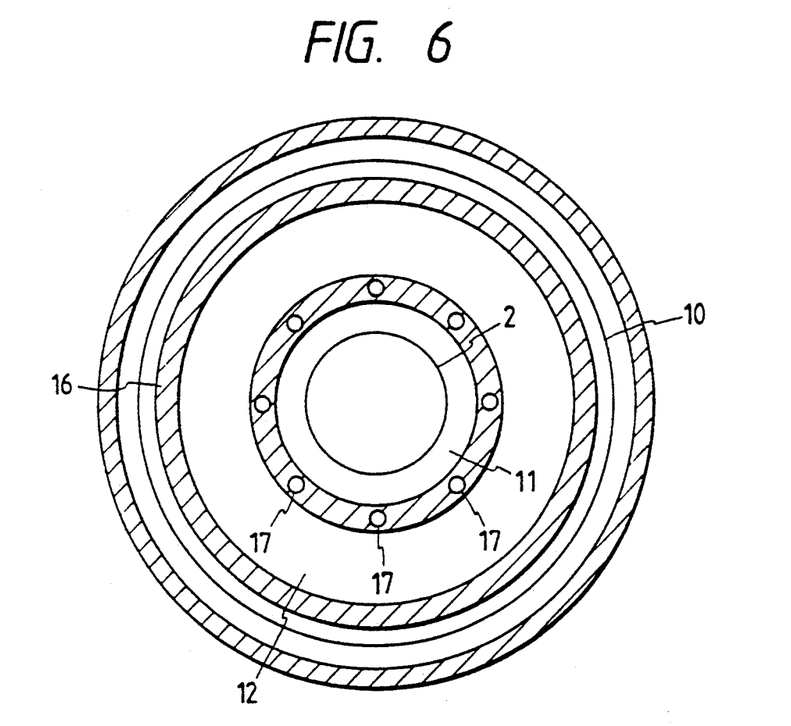
FIG. 6 is a cross-sectional view taken along line VI—VI of FIG. 5.
Figure 7:
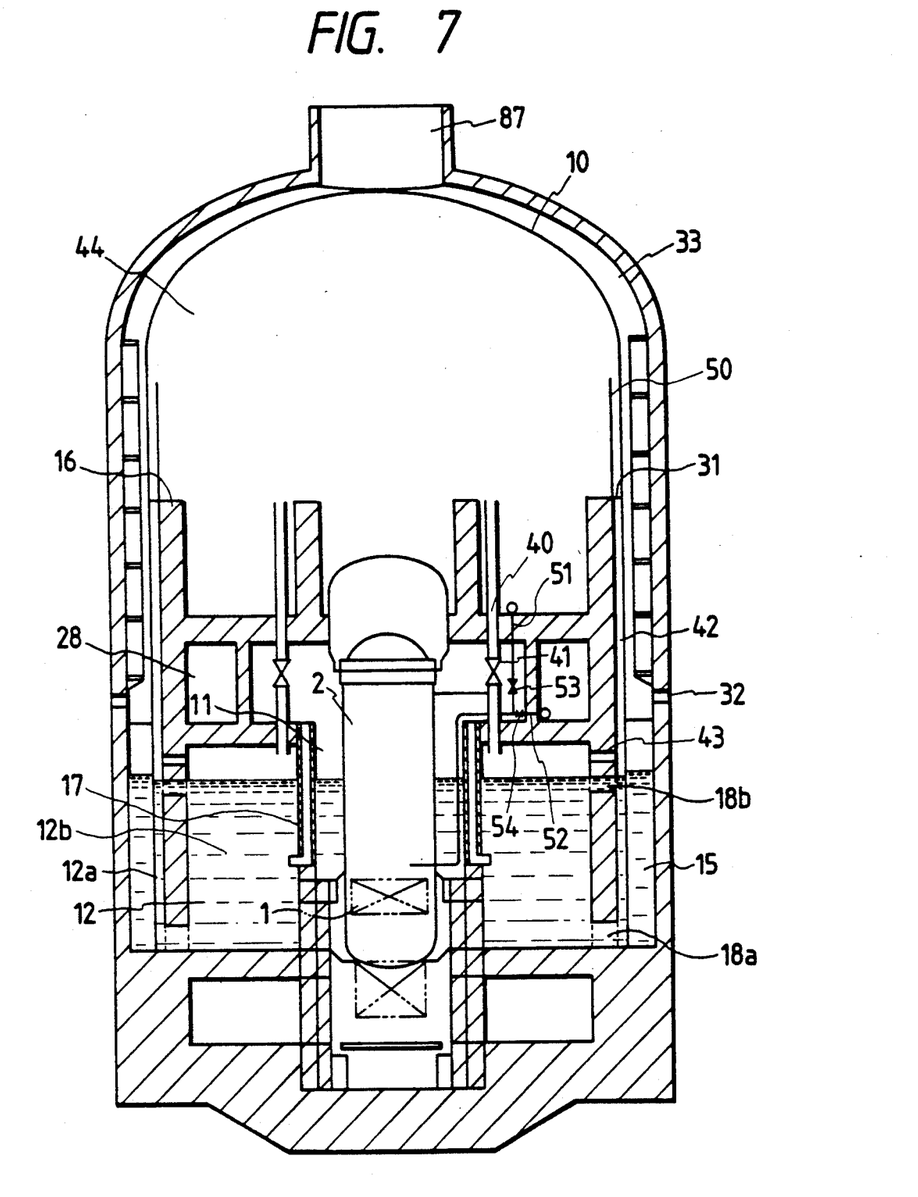
FIG. 7 shows a cross-sectional view of the embodiment of FIG. 5, after the occurrence of an accident.

Referring to FIGS. 5, 6 and 7, a second embodiment of the present invention as applied to a boiling water reactor nuclear power plant having an electrical output in the order of 600 MW will be described below. FIG. 5 shows a cross-sectional view of the embodiment before the occurrence of an accident, FIG. 6 shows a cross-sectional view taken along line A—A of FIG. 5, and FIG. 7 shows a cross-sectional view after the occurrence of the accident, respectively. A schematic construction of a nuclear reactor building shown in FIG. 5 is basically the same as that of FIG. 1. A first modification different from FIG. 1 is that, besides the cooling water pool 21, another cooling water pool 28 is installed in place of the accumulation tank 20 to retain an adequate volume of water. A second modification is that in order to lengthen the passage 42 formed between the concrete wall structure 16 and the reactor container 10, an annular passage forming wall 50 is installed extending from the upper end portion along the outer periphery of the concrete wall structure 16.

In case of a loss of coolant accident, similar to the case of the first embodiment of the invention, cooling water in cooling water pools 21, 28 is injected into a reactor core 1 through piping 51 and 52, with valves 53, 54 opened.

Then, when a valve 41 of a piping 40 connecting between an upper space portion 44 and a wet well vapor phase portion is opened, a steam generated in a pressure suppression chamber 12 by a decay heat in the core moves upward to the upper space portion 44 through the piping 40. A resulting mixture gas cooled in contact with the inner surface of the reactor container 10 is directed downward further cooled when passing through a passage 55 formed between an annular passage forming wall 50 and the inner surface of the reactor container 10, and further down through a passage 42 formed between a concrete wall structure 116 and the inner surface of the reactor container 10.

According to the present embodiment of the invention, the down-flow passage is lengthened by the length of the passage 55. Since the gas is cooled as much as in proportion to the lengthened passage, its down-flow rate is accelerated accordingly. With an increasing down-flow rate, a circulating rate of the gas becomes faster. As a result, the gas is cooled more efficiently, thereby removing the decay heat in a shorter time. Further, according to the prior art, removal of a decay heat out of a reactor core at the time of a LOCA has been done through cooling by means of an outer water pool. In this case, however, in view of a critical heat removal efficiency for the core decay heat at the time of a LOCA, the maximum plant output is limited to 600 MW. On the other hand, according to the present invention, because of the added air cooling effect at the surface of the reactor container, a discharge coefficient of the core decay heat removal at the time of a LOCA is increased, thereby enabling to provide for a larger capacity power plant.

The effects of air cooling and water cooling on the reactor container will be described quantitatively in the following, except for the effect by the annular passage forming wall 50. Whereas an overall heat transfer coefficient available through cooling by the outer periphery pool of this embodiment is approximately 0.39 kw/m$^2$k, an overall heat transfer coefficient available by the air cooling is as small as 0.011 kw/m$^2$k. Thereby, comparing only their overall heat transfer coefficients, the air cooling has an extremely smaller cooling efficiency. However, in comparing heat transfer areas in this embodiment according to the present invention, the air cooling has a greater area as large as 5100 m$^2$, while the outer periphery pool has only an area of approximately 1200 m$^2$. In addition, with respect to the temperature differences between the inside and outside of a reactor container, the air cooling has a larger value, with the outer periphery pool having approximately 24K while the air cooling having approximately 72K. When considered all together hereinabove such as overall heat transfer 20, heat transfer areas and temperature differences, respective heat radiation quantities will be calculated and expressed as follows.

Heat radiation quantity by air cooling =
0.011 (kW/m$^2$k) × 5100(m$^2$) × 72(K) =

-continued $$\text{Heat radiation quantity by outer pool cooling} = \frac{4040 \text{ kW}}{0.39 \text{ (kW/m}^2\text{k)} \times 1200 \text{(m}^2\text{)} \times 24\text{(K)} =} $$
$$11200 \text{ kw}$$

Thereby, with this air cooling effect added up to according to this embodiment, an improvement by approximately 36% in the cooling efficiency in comparison with the prior art is capable of being achieved. According to this improved efficiency in cooling capability, it is capable of providing for a larger capacity power plant capable of outputting approximately up to 820 MW, whereas the maximum output for the prior art power plant is limited to 600 MW. Further, when the effect by the annular passage forming wall 50 is considered, a far more improved output is capable of being achieved.

Figure 8:
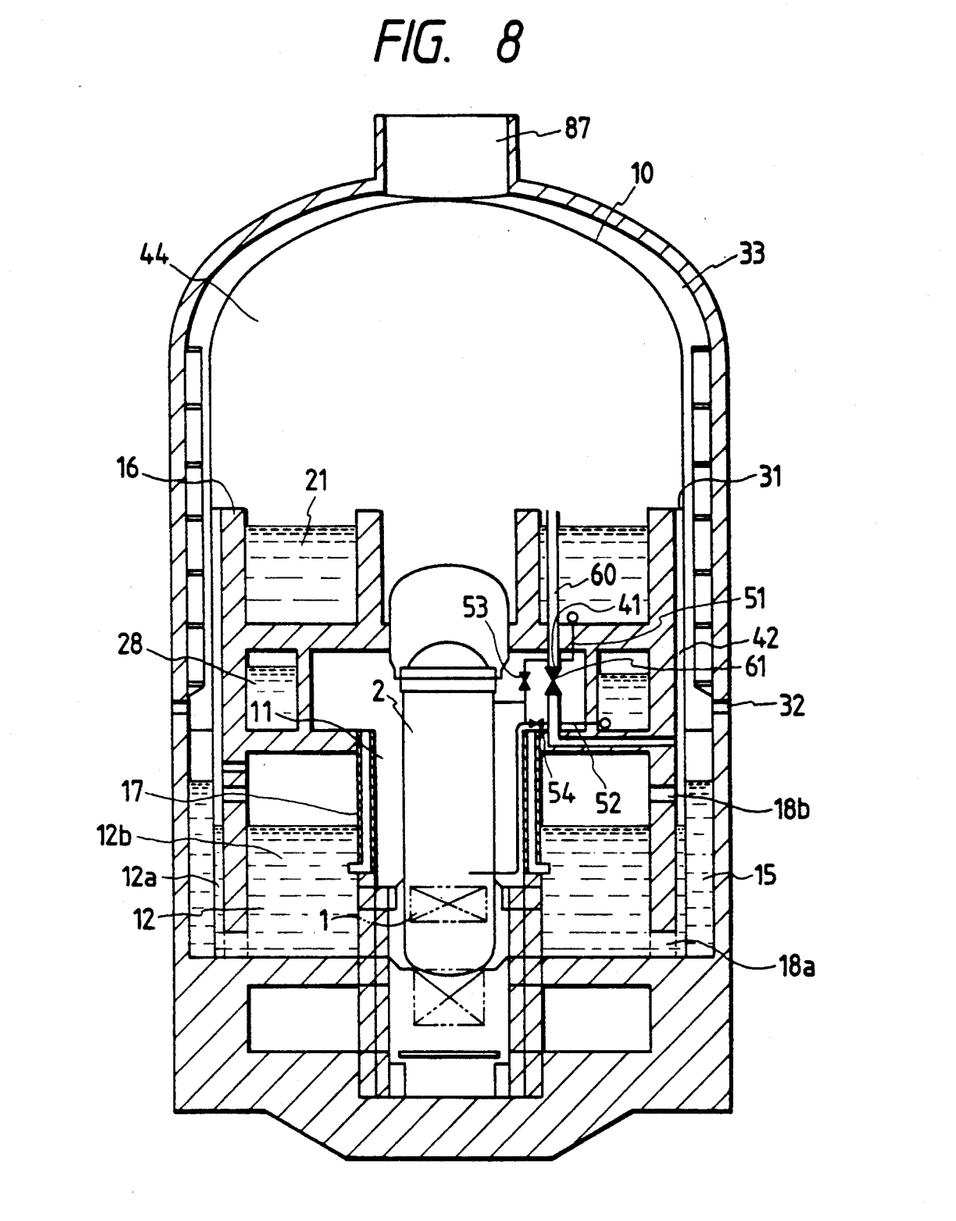
FIG. 8 is a view similar to FIGS. 4A and 5 of a third embodiment of the invention in a condition before the occurrence of an accident.
Figure 9:
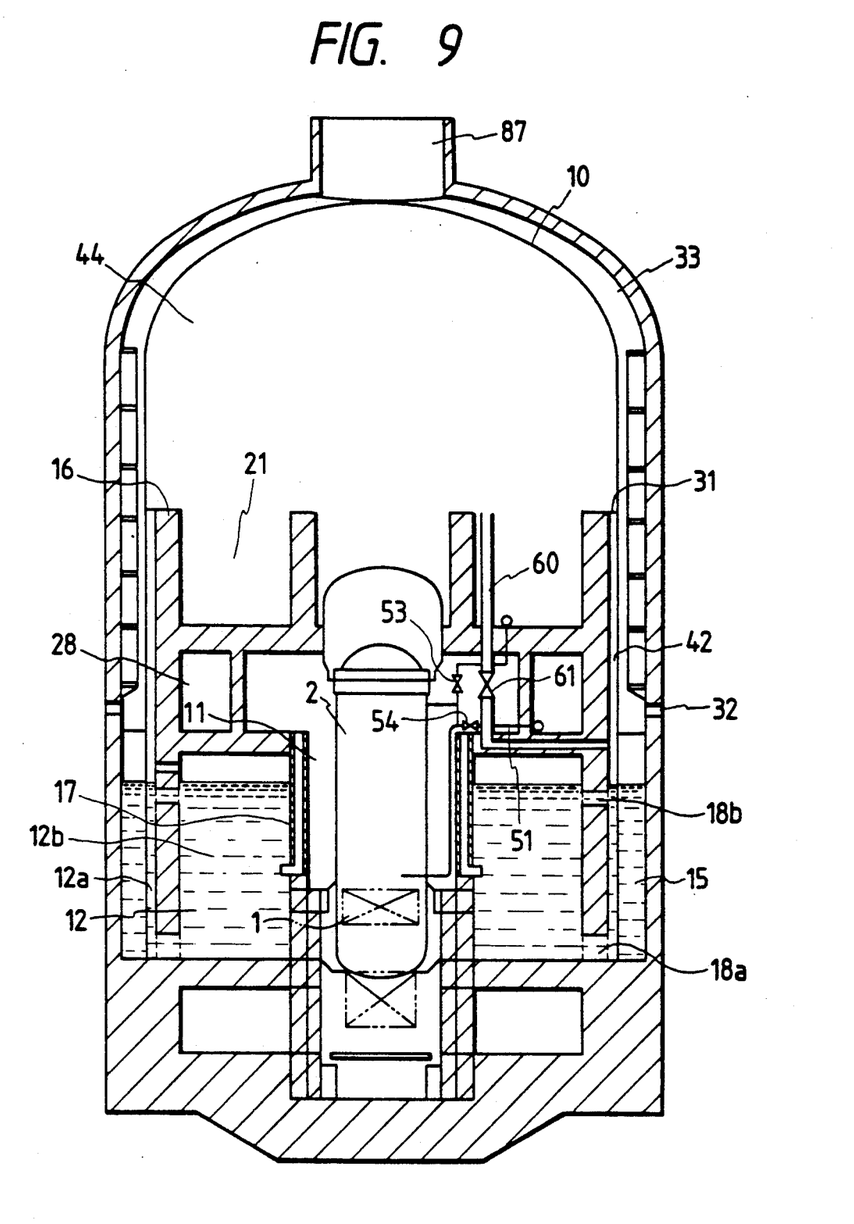
FIG. 9 is a schematic sectional view of the embodiment of FIG. 8 shown after the occurrence of an accident.

A third embodiment of the invention will be described in the following with reference to FIGS. 8 and 9. FIG. 8 shows a cross-sectional view before the occurrence of an accident, and FIG. 9 shows a cross-sectional view after the occurrence of an accident, respectively. A schematic construction of a nuclear reactor building is the same as that of FIG. 5. A difference from FIG. 5 is in that, whereas in the second embodiment of the invention, the wet well vapor phase portion and the upper space portion 44 are communicated with piping 40, in this embodiment, however, a piping 60 connecting between a passage 42 and an upper space portion 44 is formed passing through a concrete wall structure 16. When a valve 61 attached to the piping 60 is opened, the gas present in the piping 60 is heated by a decay heat in a dry well 11 or by an increased temperature in a pressure suppression chamber, producing an up-flow stream flowing into the upper space portion 44.

As a result, a purge gas present in the upper space portion constitutes a circulation passage together with the passage 42, piping 60 and the like, thereby it becomes possible to improve the air cooling effect along the inner surface of the reactor container 10.

In the hereinabove descriptions for the removal of heat, particularly of decay heat, it is dealt with by referring to examples as applied to the boiling water reactor nuclear power plants of natural heat radiation type without having any active equipment for this purpose. However, it should be appreciated that it is not limited to the above natural heat radiation type boiling water reactor nuclear power plant, but is also applicable to any case where removal of decay heat or the like from a reactor container is conducted through circulating the gas therein and heat transfer through the reactor container. Further, although the above embodiments are explained as having no active equipment for heat removal, other embodiments are contemplated which do involve an enforced circulation system such as internal circulation fans or the like.

As previously noted, in accordance with the present invention, it becomes possible to efficiently cool the gas in the reactor container. In particular, at the time of loss of coolant accidents, because the decay heat is capable of being removed efficiently through the gas in the reactor container, it is possible to substantially improve the reliability of the cooling function at the time of accidents. Further, by employing the decay heat as a circulation power source for the gas, it is possible to improve the reliability of the cooling function at the time of accidents without employing any other power source. Still further, by being able to substantially improve the cooling capability at the time of accidents, it is possible to provide for nuclear reactor cooling facilities and its method of operation whereby capable of providing a nuclear power generation plant having a far more improved output.

What is claimed:

1. A nuclear reactor arrangement for a nuclear power generation plant, comprising:
   a reactor container having a first space for housing a gas disposed in an upper portion thereof and a second space disposed in a lower portion thereof;
   an internal structure arranged in the reactor container, said second space being separated from the first space by the internal structure;
   a reactor core for heating a power transfer fluid to generate electric energy;
   a pressure vessel surrounding the reactor core and arranged in said second space;
   wherein the internal structure includes a pressure suppression chamber surrounding the pressure vessel, the pressure suppression chamber comprising a liquid phase portion holding cooling water and a vapor phase portion interfacing the liquid phase portion;
   vent passages for supplying a condensed steam, discharged into the second space from the pressure vessel, into the liquid phase portion of the pressure suppression chamber;
   a first gas guide structure forming a downward path for supplying the gas from the first space into the vapor phase portion;
   a second gas guide structure forming an upward path for supplying the gas, after being heated by the cooling water in the liquid phase portion, into the first space from the vapor phase portion; and
   a duct arranged outside of the reactor container for cooling a wall of the reactor container.

2. A nuclear reactor arrangement according to claim 1, wherein said gas is an inert gas.

3. A nuclear reactor arrangement according to claim 1, wherein said downward path is spaced further from the reactor core than the upward path.

4. A nuclear reactor arrangement according to claim 3, wherein said downward path is disposed along an internal surface of said wall of the reactor container.

5. A nuclear arrangement according to claim 1, wherein a cooling water pool is provided above the pressure suppression chamber for cooling the cooling water through the reactor container.

6. A nuclear reactor arrangement according to claim 1, wherein said upward path includes apparatus for controlling a flow of the gas.

7. A nuclear reactor arrangement according to claim 6, wherein said upward path comprises at least one pipe and said apparatus for controlling comprises a valve installed in the at least one pipe.

8. A nuclear reactor arrangement according to claim 1, wherein said downward path include apparatus for controlling a flow of the gas.

9. A nuclear reactor arrangement according to claim 8, wherein said apparatus for controlling a flow of the gas in the downward path includes a pressure relief valve which opens when pressure of the vapor phase portion is higher than a predetermined level.

10. A nuclear reactor arrangement according to claim 1, wherein said first gas guide structure has sidewalls formed of an outer wall of the internal structure and an inner side wall of the reactor container, the downward path being formed between an outer surface of the outer wall of the internal structure and an inner surface of the inner sidewall of the reactor container.

11. A nuclear reactor arrangement according to claim 1, wherein said duct has a portion arranged outside of the downward path and the reactor container.

12. A nuclear reactor arrangement according to claim 1, further comprising a cooling water pool arranged above the pressure suppression chamber and forming part of the internal structure, said cooling water pool being connected with the reactor vessel.

13. A nuclear reactor arrangement according to claim 1, wherein the liquid phase portion surrounds the reactor core outside of the pressure vessel.

14. A nuclear reactor arrangement according to claim 12, wherein said second gas guide structure penetrates through the cooling water pool.

15. A nuclear reactor arrangement for a nuclear power generation plant, comprising:
- a reactor container having a first space for housing a gas disposed in an upper portion thereof and a second space disposed in a lower portion thereof;
- an internal structure arranged in the reactor container, said second space being separated from the first space by the internal structure;
- a reactor core for heating a power transfer fluid to generate electric energy;
- a pressure vessel surrounding the reactor core and arranged in said second space;
- wherein the internal structure includes a pressure suppression chamber surrounding the pressure vessel, the prsesure suppression chamber comprising a liquid phase portion holding cooling water and a vapor phase portion interfacing the liquid phase portion;
- vent passages for supplying a condensed steam, discharged into the second space from the pressure vessel, into the liquid phase portion of the pressure suppression chamber;
- a first gas guide structure forming a downward path for supplying the gas from the first space into the vapor phase portion;
- a second gas guide structure forming an upward path for supplying the gas, after being heated by the cooling water in the liquid phase portion, into the first space from the vapor phase portion;
- a duct arranged outside of the reactor container for cooling a wall of the reactor container; and
- means for producing power for circulating said gas.

16. A nuclear reactor arrangement according to claim 15, wherein said means for producing power comprises means for circulating said gas by heating said gas through decay heat from the reactor core.

17. A nuclear reactor arrangement according to claim 15, wherein said gas guide structure includes guide structure defining a downward path for the gas and an upward path for said gas, and wherein parts of said downward path and said upward path are arranged in the internal structure and said downward path is spaced further from the reactor core than the upward path.

18. A nuclear reactor arrangement for a nuclear power generation plant, comprising:
- a reactor container having a first space for housing a gas disposed in an upper portion thereof and a second space disposed in a lower portion thereof;
- an internal structure arranged in the reactor container, said second space being separated from the first space by the internal structure;
- a reactor core for heating a power transfer fluid to generate electric energy;
- a pressure vessel surrounding the reactor core and arranged in said second space;
- wherein the internal structure includes a pressure suppression chamber surrounding the pressure vessel, the pressure suppression chamber comprising a liquid phase portion holding cooling water and a vapor phase portion interfacing the liquid phase portion;
- vent passages for supplying a condensed steam, discharged into the second space from the pressure vessel, into the liquid phase portion of the pressure suppression chamber;
- a first gas guide structure forming a downward path for supplying the gas from the first space into the vapor phase portion;
- a second gas guide structure forming an upward path for supplying the gas, after being heated by the cooling water in the liquid phase portion, into the first space from the vapor phase portion;
- a duct arranged outside of the reactor container for cooling a wall of the reactor container; and
- wherein said first and second gas guide structures positively guide the gas to flow in respective predetermined guide paths in the event of an accident causing disruption of the reactor operations with said gas effecting a cooling circulation powered by decay heat from the reactor core.

19. A nuclear reactor arrangement according to claim 18, wherein said gas guide structure includes guide structure defining a downward path for the gas and an upward path for said gas.

20. A nuclear reactor arrangement according to claim 18, wherein said downward path is spaced further from the reactor core than the upward path.

* * * * *